INVENTORS:
PIERRE CASSAGNE
JEAN BESSE
JEAN FINET
BY Kurt Kelman AGENT

INVENTORS:
PIERRE CASSAGNE
JEAN BESSE
JEAN FINET
By Kurt Kelman
AGENT 3,439,211
Patented Apr. 15, 1969

1

3,439,211
PERIODIC DEMAGNETIZATION OF COLOR CATHODE RAY TUBE ABOARD MOVING VEHICLE

Pierre Cassagne, Jean Besse, and Jean Finet, Asnieres, France, assignors to Compagnie Francaise de Television, a corporation of France Filed Feb. 16, 1967, Ser. No. 616,697
Claims priority, application France, Feb. 25, 1966, 51,136; Jan. 26, 1967, 92,641
Int. Cl. H01j *29/98;* H01f *13/00*
U.S. Cl. 315—8 3 Claims

ABSTRACT OF THE DISCLOSURE

In order to insure proper demagnetization of metal parts included in a color television picture tube, especially aboard a moving vehicle, there is provided an automatic device for starting the demagnetization process, at periodic time intervals.

The present invention relates to an improvement in demagnetization devices for television picture tubes, particularly colour television tubes.

It is known that magnetic fields, due to residual magnetism of metallic parts inside a cathode ray tube or in its vicinity may distort the reproduced picture. The residual magnetization of these metallic parts is due to terrestrial or other magnetic fields acting upon them.

The amount of residual magnetization depends upon the strength of these fields. The amount of the distortion of the picture caused by the magnetic fields varies with the remanent field strength and its direction relatively to the axis of the tube or the guns. Therefore if the receiver containing the tube is displaced, this distortion needs correction.

In a black and white (achromatic) cathode ray tube the contours of the picture will be distorted due to the parasitic deflection caused by the residual magnetic field. In tri-colour colour television tubes the parasitic deflection further affects the colour, which is even more disturbing to the viewer.

The most frequently used solution is to generate a damped alternating magnetic field in the vicinity of the screen of the receiver, when the receiver is switched on. This damped alternating magnetic field causes the magnetic induction B of the metallic parts to go through several successive hysteresis cycles of progressively diminishing amplitude, thus reducing their residual induction to a negligible value.

The device most often employed consists of a coil fed by a constant alternating current, and the cathode ray tube is subjected to its field. This coil is moved around the tube and then progressively removed from it to a distance such that most of the residual magnetism due to the previous field acting on the tube is eliminated by the effect of the field of the coil.

The tube is then under the action of the local terrestrial magnetic field only, which is then stable and its effect, taking into account the direction of the field, may be negligible. In any case its stability permits correction by means of external magnets intended for this purpose (for instance a special ring magnet placed around the neck of the tube).

It is known, furthermore, to cause demagnetization systematically whenever the receiver is switched on, by means of a coil mounted inside the receiver cabinet and fed by the power supply. A conventional circuit is known wherein resistors having a high temperature coefficient

2

(thermistors) are used to progressively limit the alternating current flowing through the coil.

This method is satisfactory as long the receiver remains stationary for at least the length of its uninterrupted operation. It is however, of no value if the receiver is aboard a moving vehicle, in which case the demagnetization should theoretically be repeated at every change of direction of the vehicle with respect to that of the terrestrial magnetic field.

The receiver could obviously be fitted with a manually operated control device for the switching on of a conventional demagnetization circuit, with the viewer operating the control device whenever it becomes necessary, but this is of course a nuisance for the viewer. Moreover this solution does not apply when the receiver is beyond the viewer's reach.

The present invention provides a satisfactory solufion for the abovementioned problem.

According to the invention there is provided a device for demagnetizing metallic parts inside or in the vicinity of the television picture tube included in a television receiver, said tube comprising at least one electron gun for generating an electron beam, said device being of the type in which demagnetization occurs under the action of a magnetic field due to a damped alternating current flowing through a demagnetization circuit comprising a demagnetizing coil adapted to periodically demagnetize ferromagnetic parts inside and in the vicinity of said receiver. The current is so arranged as to cause the demagnetization to occur during each vertical blanking interval. Should the demagnetization period be longer than the blanking interval, the series is automatically blanked out for the duration.

The term duration of the demagnetization process means the interval of time extending from the triggering of the demagnetization circuit to the instant when the amplitude of the current flowing through the coil has reached a negligible value, namely about on tenth of its initial amplitude.

The applicants have found that it is possible to design an efficient demagnetizing device of this kind using only a moderate amount of energy, and operating without causing any disturbance to the viewer.

The invention can be applied to cathode ray tubes for television, both colour and black-and-white. For the sake of simplicity three-gun colour television picture tubes will be considered hereinafter, this being of course a non-limitative example.

The invention will be better understood and other features will become apparent with the help of the description which follows and the accompanying drawings, wherein:

FIG. 1 illustrates the demagnetization process. The magnetic field strength H is plotted on the abscissa and magnetic induction B of a part being demagnetized is plotted on the ordinate.

Figure 1:
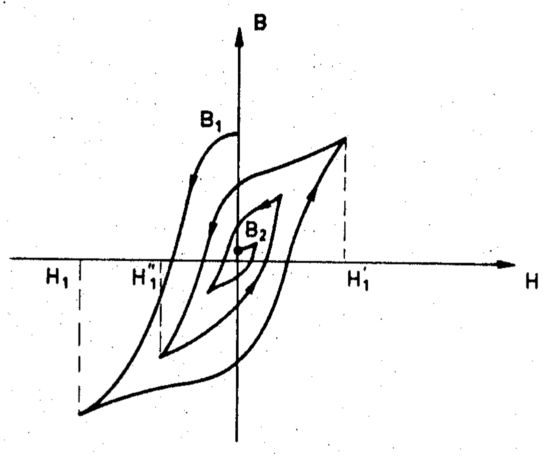
FIG. 1 illustrates a set of hysteresis curves with decreasing amplitude as occurring in metallic parts when demagnetization circuits are used.

The continuous curve shows how to obtain an important reduction of the residual induction from $B_1$ to $B_2$ by means of a damped alternating field, which causes the induction B to run through all the values on the curve in the direction of the arrows. The field strength H takes on successive values $H_1$, $H_1'$, $H_1''$, etc. In FIG. 1 it has been assumed that the metallic part was originally placed in an amagnetic space.

Figure 2:
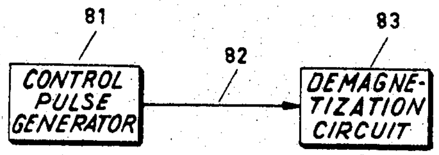
FIG. 2 is a block diagram of a demagnetization device according to the invention.

FIG. 2 is a block diagram of a demagnetization device according to the invention.

In FIG. 2, a pulse generator 81 delivers control pulses at recurrent intervals. A generator of this kind will preferably be an astable multivibrator producing a periodic signal.

The control pulses supplied by generator 81 are applied to the control input 82 of the demagnetization circuit 83. Each control pulse applied to this circuit has the effect of starting a demagnetization process.

Due to the relatively short duration of the demagnetization process, it repetition rate may be considered as equal to the time interval between two successive operations. The choice of the repetition frequency of the control pulses produced by generator 81 is therefore an important factor.

The applicant has found that demagnetization could, however, be carried out periodically, independently from the image reproduction process, if certain conditions, concerning not only to the duration of each demagnetization process, but also the time interval between two such consecutive operations, were fulfilled.

In particular, it was found that the minimum time interval separating two demagnetization processes which can be used if the disturbance is to remain virtually negligible, remains approximately the same and is of the order of fifteen seconds for any duration of the demagnetization process not substantially in excess of one field duration, and it has therefore been possible to design a particularly advantageous demagnetization device by satisfying these conditions, this because the latter allow the use of simple circuits and are compatible with an efficient operation of the device. It is quite clear indeed that a demagnetization operation needing a limited amount of energy requires a certain minimum time for demagnetization to become effective, and that those operations should be carried out at sufficiently frequent intervals to follow the variations of the direction of the terrestrial magnetic field with respect to the receiver.

Experience has shown that a period P shorter than five seconds is generally disturbing to the viewer; in this respect, this period will preferably be made even longer than fifteen seconds. On the other hand, in order to take into account the changes in the direction of the magnetic field relatively to the receiver in usual working conditions, it is undesirable to make this period longer than one minute. A value of around thirty seconds is generally an excellent compromise.

The duration of each demagnetization process is also of importance. Experience has shown that a value of the order of 5 milliseconds usually allows to obtain efficient demagnetization using a moderate amount of energy.

Figure 3:
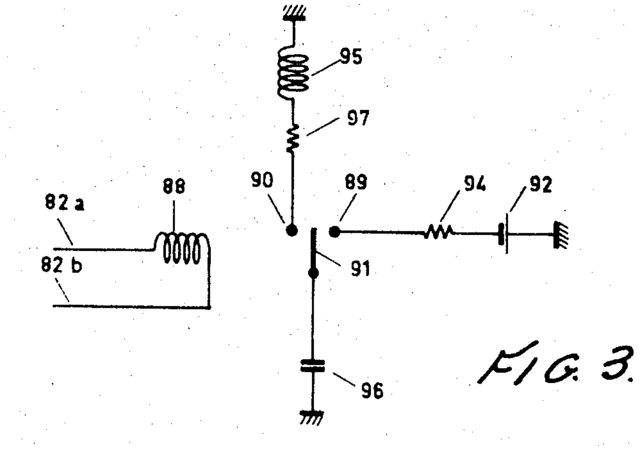
FIG. 3 shows a detailed embodiment of the demagnetization circuit of FIG. 2.

A convenient embodiment of the demagnetization circuits (illustrated by 83 in FIG. 2) is shown in FIG. 3.

The control pulses supplied by generator 81 of FIG. 2 are applied to the two terminals **82*a* and 82*b* of the coil 88 of an electromagnetic relay provided with two fixed contacts 89 and 90 and a moving contact 91**.

The fixed contact 89 is connected to ground through a circuit comprising in series a resistor 94 and a voltage source 92. The fixed contact 90 is connected to ground through a circuit comprising in series a resistor 97 and the demagnetization coil 95 which produces the demagnetizing field. The moving contact 91 is connected to one of the terminals of a capacitor 96 whose other terminal is grounded.

This device operates in the following manner:

The voltage applied to the terminals **82*a* and 82*b* of the energizing coil of the relay, is of a periodic nature and has a rectangular waveform. During a part of this period, which shall be called the quiescent period, this voltage is zero so that the relay is not energized. The moving contact 91 is therefore in its resting position, in which it is in contact with the fixed contact 89. This means that during the quiescent period, the capacitor 96 is charged to the potential of the source 92 across resistor 94**, which limits the charging current.

At the end of the quiescent period, the voltage applied to the winding 88 energizes the relay and the moving contact 91 takes up its working position, i.e. it comes into contact with the fixed contact 90. The capacitor 96 now discharges across the series arrangement of resistor 97 and coil 95, those three elements forming a damped oscillating circuit, and the discharge current, which has the form of a damped sine wave carries out the demagnetization.

The resonant frequency of this circuit, and the resistance of the resistor 97, will be preferably selected so that the duration, as defined hereinbefore, of the demagnetization process corresponds to about 20 cycles of the damped sine wave. The value of the voltage of source 92 is subsequently adjusted in order to insure the effectiveness of the demagnetization process.

If the abovementioned indications for choosing the repetition frequency of the control pulses and the duration of each demagnetization process are respected, any disturbance to the viewer remains generally negligible. It is, however, possible to reduce this disturbance even more by triggering the demagnetization process at the beginning of a vertical blanking interval.

As is well known, the reproduction of a television picture is effected discontinuously by the transmission of picture signals being interrupted during the so called vertical blanking intervals, during which vertical retrace of the spot occurs. During those intervals the electron guns of the tube are cut off. It is obvious that the magnetic field of the demagnetizing coil can in no way perturb the picture while the electron beams are suppressed.

It is therefore possible to minimize any visible effects of the demagnetization process if the beginning of this process is made to coincide with the beginning of a vertical blanking interval. If in this case the duration of the demagnetization process does not exceed that of the blanking interval, i.e. about 2 milliseconds, there will be no perturbation of the picture at all and period P can then be reduced, if necessary.

Generally it is however, difficult to achieve efficient demagnetization in such a short time and the end of the process will overlap into the active field duration, this last expression meaning the time elapsing between two successive vertical blanking intervals and reserved for the transmission of the picture signal. Nevertheless, as the demagnetization current is strongly damped, this perturbation may generally be practically disregarded.

A coincidence of the respective beginnings of the vertical blanking interval and the demagnetization process may easily be obtained through using a synchronizing signal derived from the vertical retrace and applying this signal to a trigger input of the control pulse generator of FIG. 2. Such a way of triggering a multivibrator is well known.

Figure 5:
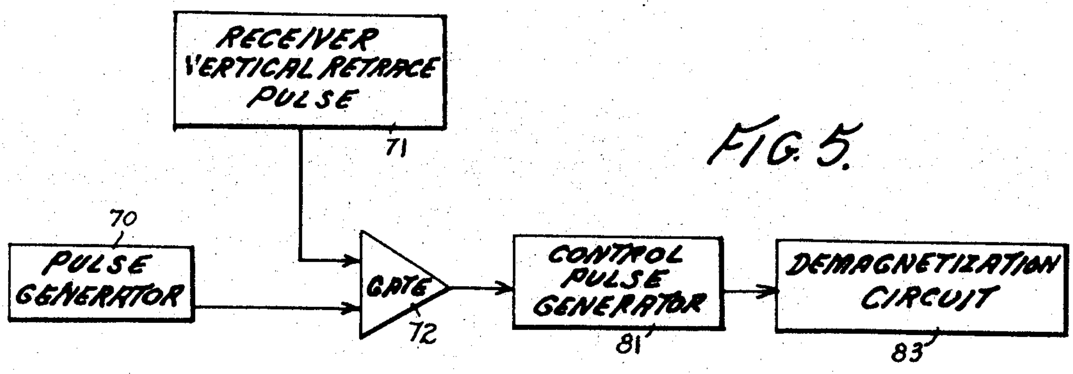
FIG. 5 shows a block diagram for synchronizing the beginning of the demagnetization process with a vertical blanking interval.

FIG. 5 indicates one such configuration. Pulse generator 70 produces pulses the duration of which is slightly shorter than the duration of the field painting cycle of the CRT screen. Pulse generator 70 can be any suitable circuit such as a free-running astable multivibrator. The output pulse from generator 70 sets the control input of gate 72. The signal input to gate 72 is from the receiver itself 71. When a pulse from generator 70 unblocks gate 72, the vertical retrace pulse from receiver 71 passes through it and an output appears at the gate 72. Control pulse generator 81 is of the trigger type and can be a one-shot multivibrator such as well known Schmitt circuit. Control pulse generator 81 generates a pulse whose duration corresponds to the duration of the demagnetization process. This output pulse is coupled to the coil of the relay of the demagnetizing circuit 83.

In the embodiments shown above the duration of the demagnetization process should preferably be relatively short, i.e. of the order of 5 milliseconds, which is adequate for tubes of current dimensions. This relatively short duration could, however, present difficulties, if the demagnetizing coil were voluminous and relatively big metallic parts were involved, for in that case the power needed for rapid demagnetization can become important. The applicant has observed experimentally that a blanking period of the electron ray covering the duration of the demagnetization process is less disturbing than the distortions caused by the magnetic field of the demagnetizing coil.

A further refinement consists in surpressing the electron beams for the entire duration of the demagnetization process.

The blanking period can however be longer than the duration of the demagnetization process and experience has shown that a duration of one field period (i.e. approximately 20 milliseconds) is the optimum value.

Figure 4:
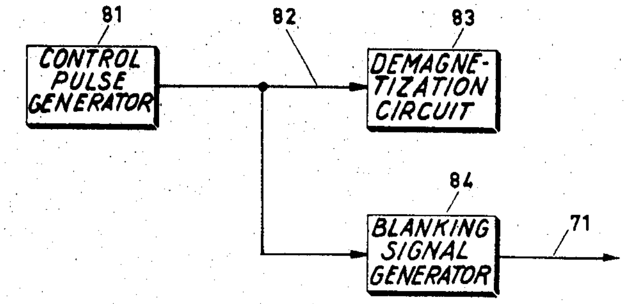
FIG. 4 shows a block diagram of an improved embodiment of the demagnetization circuit according to the invention, wherein this circuit is combined with a blanking circuit.

FIG. 4 shows a block-diagram of a demagnetization device with this improvement. In this figure the elements carrying reference numbers 81, 82 and 83 are identical to those of FIG. 2.

Control pulses supplied by generator 81 are on the one hand applied to the input of the demagnetization circuit 83, as in FIG. 2, and on the other hand applied to the input of a blanking signal generator, which can for example be a monostable multivibrator. This generator 84 supplies at its output 71 a blanking pulse whose duration is equal to one field period. This pulse is applied to the control electrodes of the electron guns of the cathode ray tube with an amplitude and polarity ensuring the suppressing of the beams.

The scope of this invention is obviously not limited to the embodiments described, which were given by way of non-limitative examples.

What is claimed is:

1. In combination, aboard a moving vehicle, a color TV receiver adapted to display TV pictures on a tricolor cathode ray tube screen of a type selected from the shadow-mask type and the postfocalization grid type, said tube having a display interval and a vertical blanking interval, a demagnetizing device including a demagnetizing coil positioned around said cathode ray tube adjacent to said display screen for minimizing the effect of the ambient magnetic field on the operation of said cathode ray tube, said device comprising said resonant circuit including a demagnetizing coil for demagnetizing ferromagnetic parts when said circuit is excited to produce a damped oscillatory current, means for periodically exciting said circuits during the entire time in which said receiver is operating, means for synchronizing said periodic excitation with said vertical blanking interval whereby continuous periodic demagnetization is achieved with minimal viewer disturbance, and means for suppressing the initial part of said display interval until each periodic demagnetization is completed.

2. The combination set forth in claim 1 wherein said demagnetizing coil is periodically energized for a duration comprised between 5 and 20 milliseconds.

3. The combination set forth in claim 1 wherein said demagnetizing coil is periodically energized with a recurrence period comprised between 5 seconds and one minute.

References Cited

UNITED STATES PATENTS

| | | | |
|---|---|---|---|
| 2,962,621 | 11/1960 | Fernald | 315—8 |
| 3,274,452 | 9/1966 | Landes | 317—157.5 |

ROBERT SEGAL, *Primary Examiner.*

U.S. Cl. X.R.

317—157.5